Aug. 14, 1945.  C. I. BAKER  2,381,872
ARTIFICIAL HORIZON AND BANK INDICATOR FOR AIRCRAFT TRAINERS
Filed Aug. 17, 1943  2 Sheets-Sheet 1
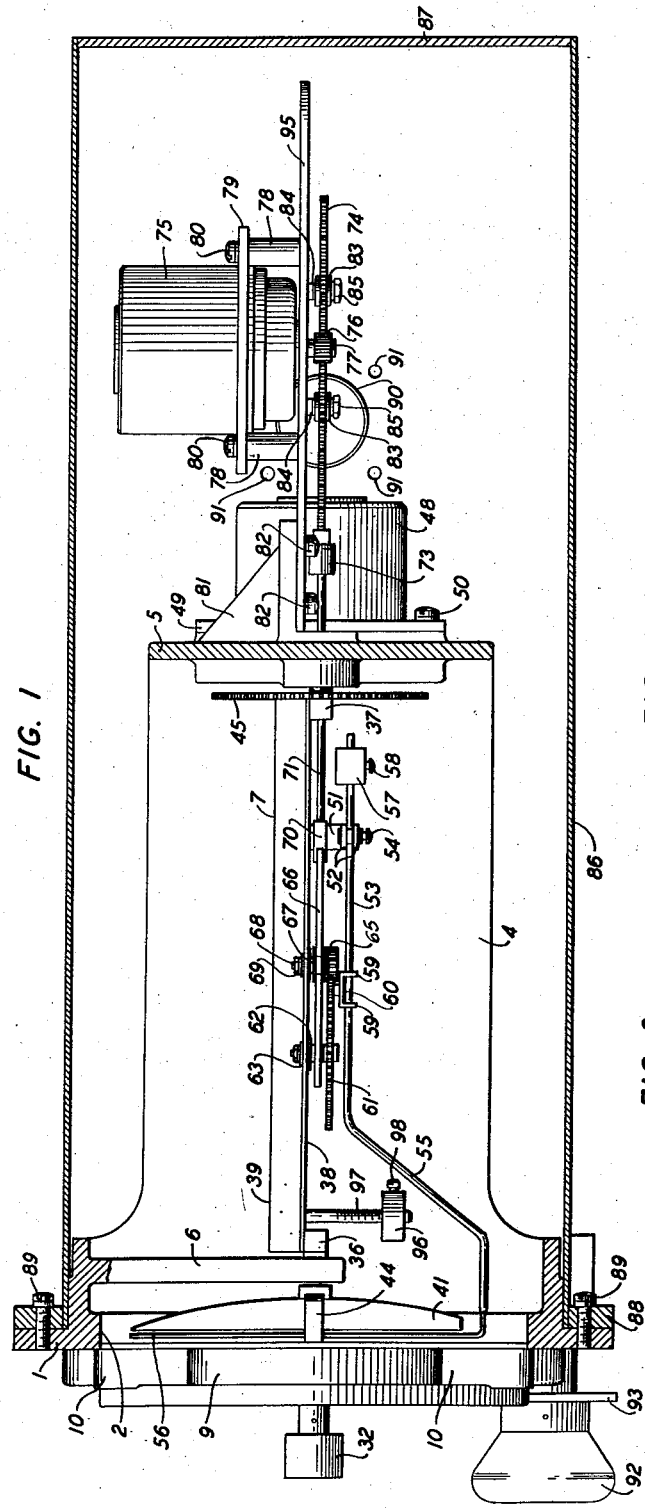
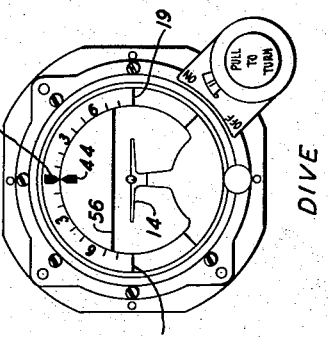
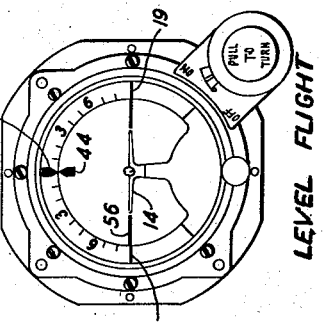
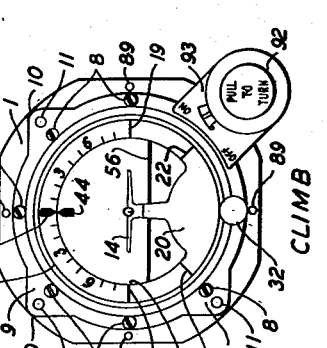
INVENTOR
C. I. BAKER
BY
P. C. Smith
ATTORNEY Aug. 14, 1945.  C. I. BAKER  2,381,872
ARTIFICIAL HORIZON AND BANK INDICATOR FOR AIRCRAFT TRAINERS
Filed Aug. 17, 1943   2 Sheets—Sheet 2
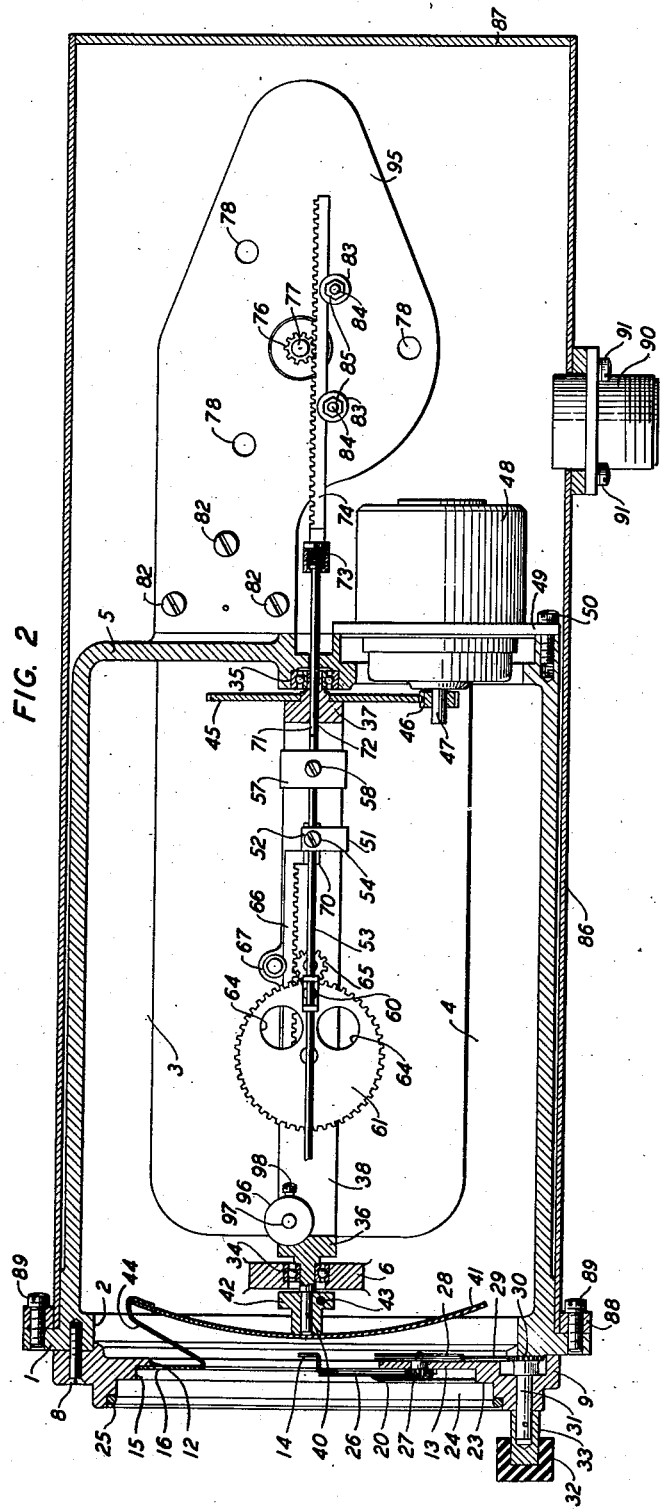
INVENTOR
C. I. BAKER
BY
P. C. Smith
ATTORNEY Patented Aug. 14, 1945

2,381,872

UNITED STATES PATENT OFFICE 2,381,872

ARTIFICIAL HORIZON AND BANK INDICATOR FOR AIRCRAFT TRAINERS

Clarence I. Baker, Elizabeth, N. J., assignor to Bell Telephone Laboratories, Incorporated, New York, N. Y., a corporation of New York Application August 17, 1943, Serial No. 498,913

7 Claims. (Cl. 177—337)

This invention relates to an artificial horizon and bank indicator for use in an aircraft trainer.

For the purpose of training the pilot of an aircraft to conduct a flight by the observation of instruments, ground trainers have been developed which are provided with the controls and flight recording instruments which would be found in an actual aircraft. By operating the controls a pilot may simulate an actual flight and observe the response of the instruments to his operation of the controls and yet the trainer does not leave the ground. A trainer of this type materially reduces the actual air flight training in an actual aircraft and reduces the hazards to both the pilot and to the aircraft during the preliminary training period.

Among the instruments which are required to give the pilot under training the simulation of actual flight is an artificial horizon instrument which is responsive to the operation of the yoke or elevator control to indicate to the pilot whether in response to his operation of the elevator he is simulating a climbing, a level or a descending flight and which is also responsive to the operation of the rudder pedals or rudder control or to the aileron control or to both to indicate to the pilot the direction and degree of bank of the simulated flight.

The object of the invention is to provide an instrument of this character which is simple in construction, reliable in operation, which requires a minimum of energy for its operation and which may be operated in an aircraft trainer in simulation of the operation of the usual gyroscope controlled horizon and bank indicator.

To attain this object the face of the casing of the instrument is provided with the usual bank or turn scale and with a vertically adjustable silhouette of an aircraft. Positioned back of the scale and visible through the face of the casing is a background disc of the usual type, the lower portion of which is colored to represent the ground and the upper portion of which is colored to denote the sky. The bank indicator pointer is secured to the upper edge of the background disc in a position to cooperate with the bank or turn scale when the background disc is rotated.

The background disc is secured to the forward end of a carriage mounted for rotation on a horizontal axis aligned with the center of the bank and turn scale. To enable this carriage to be freely rotated it is journaled in ball bearings. To rotate the carriage a gear is secured to the rear end thereof which is driven by a pinion secured to the shaft of a motor of the self-synchronous type.

A bar simulating the horizon lies in front of the background disc and is movable in a plane parallel to the surface of such disc. For this purpose the horizon bar is provided with a portion extending rearwardly which is pivoted near its rear end to the carriage. This horizon bar is oscillatable about its pivot by a crank pin carried by a gear which pin slidably engages the rearwardly extending portion of the horizon bar. This gear is rotatable on a stub shaft secured to the carriage, by a pinion rotatable on a second stub shaft also secured to the carriage. The pinion is in turn operated by a rack which is attached to one end of a rod slidable in an axial hole extending through the rear ball bearing. The other end of the rod is connected by a swivel coupling to a second rack operable by a second motor of the self-synchronous type.

Through the operation of the two motors, the background disc and horizon bar are tiltable with respect to the silhoutte to give the illusion that the trainer is banked for a turn and the horizon bar is depressed or raised to give the illusion that the trainer is either climbing or diving.

For a clearer understanding of the invention, reference may now be had to the following detailed description thereof taken in connection with the accompanying drawings in which:

Fig. 1 is a top plan view of the horizon and bank indicator partly in cross-section;

Fig. 2 is a side elevational view partly in cross-section;

Fig. 3 is a front view of the indicator drawn to a reduced scale showing the position of the horizon bar to denote a climb;

Fig. 4 is a similar front view of the indicator showing the position of the horizon bar to denote level flight;

Fig. 5 is a similar front view of the indicator showing the position of the horizon bar to denote a dive; and Fig. 6 is a similar front view of the indicator showing the position of the horizon bar to denote a correctly banked turn to the right.

The artificial horizon and bank indicator in accordance with the present invention is provided with a supporting frame comprising a substantially circular front wall 1 having a circular opening 2 therein, two rearwardly extending and cylindrically contoured arms 3 and 4 and a cross member 5 joining the rear ends of the arms and lying in a plane parallel to the front wall 1. The frame is also provided near its front wall with a horizontally extending post 6 which serves to support a ball bearing in which the forward end of a carriage 7 is journaled.

Secured by screws 8 to the front wall 1 of the supporting frame, is a dial ring 9 of substantially circular shape provided with four diametrically extending portions 10 each having a threaded hole 11 therein for receiving a screw by which the instrument may be supported on the instrument panel of the trainer. The dial ring 9 is provided with an opening 12 therethrough of substantially the shape disclosed in Fig. 3 providing at its lower end a post 13 for supporting a miniature representation 14 of the rear of an aircraft.

The ring 9 is provided with a shoulder 15 adjacent the edge of the opening 12 upon which is seated a mask 16. The upper half of the mask is graduated from 0 to 90 degrees to the right and left of the center index 17 as best shown in Fig. 3 with the 90 degree markings of the scales widened as at 18 and 19 and positioned to be in alignment with the horizon bar when the trainer is being operated to simulate level flight, as best shown in Fig. 4. The lower part of the mask is shaped as shown at 20 in Fig. 3 and is bent outwardly at 21 and 22 to afford space for the aircraft silhouette 14 and the adjusting mechanism therefor. The ring 9 is also provided with an additional shoulder 23 in which is seated a cover glass 24 held in place by a spring retaining or bezel ring 25. The aircraft silhouette 14 is vertically adjustable and for this purpose is provided with downwardly extending rack portion 26 which meshes with a pinion 27 rotatably supported on the post 13 and having a gear 28 secured thereto and positioned at the rear of the post 13. Gear 28 may be rotated by the pinion 30 through an idler gear 29 meshed with the gear 28 and with the pinion 30. The pinion 30 is secured to the inner end of a spindle 31 journaled in a bearing formed in the lower edge of the ring 9. A knob 32 is secured in any desired manner to the outer end of the spindle, for example, the knob may be molded upon a thimble 33 which thimble may be secured to the spindle by a set screw. When the knob 32 is turned to rotate the pinion 30, the rotation of the pinion is communicated through the gears 29, 28 and 27 to cause the silhouette to be raised or lowered as desired.

The post 6 is provided adjacent to its inner end with a hole in which is positioned a front ball bearing assembly 34, the axial center of which is aligned with the center of the opening 2 of the supporting frame, and the cross member 5 is also provided with a hole in which is positioned a rear ball bearing assembly 35, the axial center of which is aligned with the center of bearing assembly 34. The inner raceways of these bearing assemblies are disposed on cylindrically formed portions extending from the end members 36 and 37 of the carriage 7. These end members are joined by a face plate portion 38 strengthened on its rear face by a web 39.

The cylindrical portion of the front end member 36 of the carriage extends forwardly beyond the post 6 as shown at 40 to support the background disc 41. The disc 41 is circular in outline but is dished cylindrically as best disclosed in Fig. 2 and is secured at its center to a split hub 42 which is secured by a suitable clamping screw 43 to the extension 40 of the carriage, whereby the disc is rotated about the axis of the instrument when the carriage is rotated. The upper portion of the front face of the disc is colored to represent the sky and the lower portion of the front face of the disc is colored to denote the ground. Thus as the trainee views the face of the instrument as it is mounted on his instrument panel, he sees the miniature aircraft 14 silhouetted against the background disc 41.

Secured to the upper edge of the disc 41 and extending through the opening 2 in the supporting frame and the opening 12 in the dial ring 9 is a pointer 44. This pointer has its outer end turned upwardly in the plane of the mask 16 to be movable upon the rotation of the carriage and background disc along the inner edge of the scale on the mask 16. If the trainer is operated to simulate level flight or a climbing or diving condition with no bank for a turn, the pointer 44 will be aligned with the center index 17 of the scale as disclosed in Figs. 3, 4 and 5. If, however, the trainer is operated to simulate a banked condition, the pointer will move over the scale to the left or right of the center index 17 to indicate the degree and direction of the bank. Fig. 6 shows the pointer 44 moved to indicate approximately a 30 degree bank for a right turn.

The carriage 7 is rotatable in the ball bearing assemblies 34 and 35 by a gear 45 mounted on a circular shoulder of the end member 37 of the carriage and secured thereto as by swaging, which gear is driven by a pinion 46 mounted on the shaft 47 of a driving motor 48. The motor 48 is of the self-synchronous type which is coupled electrically with a synchro-transmitter driven by one of the motor control circuits of the trainer. This motor is provided with a mounting plate 49 by which it is secured to the cross member 5 of the supporting frame by lag screws 50.

Secured to the face plate 38 of the carriage 7 is a bracket 51 having two parallelly disposed upwardly extending ears 52 between which a bar 53 is pivoted by a pivot screw 54. The bar 53 extends toward the front of the instrument, is bent outwardly at 55, as best shown in Fig. 1, to a point outside the edge of the background disc 41 and is then bent at right angles to form a horizon bar 56 which extends horizontally across the face of the background disc but sufficiently spaced therefrom to be freely movable in a cylindrical plane parallel to the face of the disc. The bar 53 is balanced on the pivot screw 54 by an adjustable counter-weight 57 movable along the bar and secured thereto by the set screw 58.

For oscillating the bar 53 about its pivot screw, the bar slidably extends through holes in the parallelly disposed ears 59 in a crank pin 60 pivotally secured to the spur gear 61. This spur gear is rotatable on a stub shaft 62 secured to the face plate 38 of the carriage by the nut 63. As gear 61 is rotated the crank pin 60 moves the rod 53 up or down from the center position disclosed in Fig. 2 depending upon the direction of rotation of the gear, thereby raising or lowering the horizon bar 56 with respect to the silhouette 14 and the end-of-scale markings 18 and 19. Gear 61 is cut away as indicated at 64 in Fig. 2 to balance the additional weight added thereto by the crank pin 60.

The gear 61 is driven by a pinion 65 rotatably mounted on another stub shaft secured to the face plate 38 in the same manner as the stub shaft 62. This pinion in turn is driven by a slidable rack 66. The rack 66 is held in mesh with the pinion 65 and guided in its movement by a grooved roller 67 which is rotatably mounted on another stub shaft 68 secured to the face plate 38 by the nut 69. One end of the rack 66 terminates in a sleeve 70 by which it is secured to one end of a cylindrical driving rod 71. The rod 71 extends freely through a hole 72 drilled axially through the cylindrical extension of the end member 37 of the frame on which the ball bearing assembly 35 is mounted, and through a hole in the cross member 5 of the supporting frame and terminates in a headed portion enclosed in the casing 73 of a swivel coupling of well-known construction, best disclosed in Fig. 2. Extending from the other side of the swivel coupling is a rack 74.

For operating the rack a motor 75 is provided having a pinion 76 secured to its rotor shaft 77. The motor is provided with a mounting plate 79 which is supported on posts 78 riveted or otherwise secured to a mounting plate 95 and is secured to such posts by the screws 80. The plate 95 is in turn secured to a bracket 81, formed integrally with the cross member 5 of the supporting frame, by the screws 82.

The rack 74 is held in mesh with the pinion 76 and in alignment with the driving rod 71 by grooved rollers 83 which are rotatably mounted on stub shafts 84 secured to the mounting plate 95. The rollers are held on said shafts by the nuts 85.

The instrument is protected from dust and mechanical injury by a cylindrical cover 86 having a rear end closure 87 welded thereto and having a clamping ring 88 secured, as by welding, to its forward edge. The cover is secured to the front wall 1 of the supporting frame by the lag screws 89. A multi-terminal connector 90 is secured to the cover 86 by screws 91 to afford means for extending operating circuits to the motors 48 and 75.

The knob 92 and index plate 93 have no utility in the instrument of the present invention but since they do form a useful part of the horizon and bank indicator appearing on the instrument panel of a regular aircraft, they are retained in order that when the trainee looks at the instrument, it will have exactly the same appearance as the instrument of a regular aircraft.

Through the operation of the motor 75 under the control of a motor control circuit of the trainer in which the instrument is installed in response to the operation of the controls of simulate level flight, a climbing flight or a diving flight, the rack 74 is operated either to the left or to the right and through the connecting rod 71, the rack 66, the pinion 64 and the gear 61, causes either a depression or a raising of the horizon bar 56. If the bar 56 is depressed as disclosed in Fig. 3 below the silhouette 14, a climb is denoted. If the bar assumes the position disclosed in Fig. 4 in alignment with the silhouette a level flight is denoted and if the bar is raised as disclosed in Fig. 5 above the silhouette a dive is denoted.

As previously described the operation of the motor 48 under the control of a motor control circuit of the trainer in response to the operation of the controls to simulate a banked turn, rotates the carriage 7 through the operation of the gears 45 and 46. Such turning is unhampered by the engagement of the rack 74 with the pinion 76 and rollers 83 through the provision of the swivel coupling 73. The turning of the carriage is effective to turn the background disc 41, the pointer 44 and the horizon bar 56. For a correct bank for a right turn, the horizon bar will assume a position such as is illustrated in Fig. 6.

Since self-synchronizing motors of the type employed most accurately follow the operation of their driving synchro-transmitters when they are required to handle a minimum load, the parts of the instrument movable thereby are made as light as possible, made to move freely as by the use of the ball bearing assemblies 34 and 35 and by the guiding rollers 67 and 83 and the parts are carefully counter-balanced as by the provision of the counter-balancing weight 57 for counter-balancing the horizon bar 56, by the provision of the holes 64 in the gear 61 for counter-balancing the crank pin 60 and by the provision of the counter-balanced weight 96 threaded upon the stud 97 extending from the carriage 7 and held in its adjusted position by the set screw 98, which balances the carriage 7 and the mechanism carried thereby.

As an alternative construction, the rod 71 could be made slightly larger in diameter and provided with circumferentially cut rack teeth on each end thereof, the rack teeth on one end meshing with the pinion 64 and the rack teeth on the other end meshing with the motor pinion 76. With this type of construction the swivel coupling 73 could be omitted.

What is claimed is:

1. In a horizon and bank indicator for an aircraft trainer, a frame, a bank indicating scale secured thereto, a background disc, a pointer secured to said disc for cooperation with said scale, a pivoted horizon bar positioned in front of said disc, a motor for rotating said disc and said horizon bar together, whereby said pointer is moved with respect to said scale, and a second motor for moving said horizon bar about its pivot independently of said disc to move said bar in a plane parallel to the surface of said disc.

2. In a horizon and bank indicator for an aircraft trainer, a frame, a first and a second driving motor mounted on said frame, a bank indicating scale secured to said frame, a carriage pivotally mounted in said frame, a background disc having a bank pointer secured thereto carried by said carriage, gearing driven by said first motor for rotating said carriage to move said disc and pointer with respect to said scale, a horizon bar pivoted on said carriage, and means driven by said second motor for moving said horizon bar over the face of said background disc comprising a gear rotatably mounted on said carriage, a crank pin pivotally secured to said gear and slidably engaged with said bar, a pinion gear rotatably mounted on said carriage and in mesh with said first gear and a rack member slidably extending through a hole formed axially in a pivotal mounting of said carriage and in mesh with said pinion gear and with a pinion on the shaft of said second motor.

3. In a horizon and bank indicator for an aircraft trainer, a frame, a first and a second driving motor mounted on said frame, a bank indicating scale secured to said frame, ball bearing assemblies mounted in said frame, a carriage journaled in said bearing assemblies, a background disc having a bank pointer secured thereto carried by said carriage, gearing driven by said first motor for rotating said carriage to move said disc and pointer with respect to said scale, a horizon bar pivoted on said carriage, and means driven by said second motor for moving said horizon bar over the face of said background disc comprising a gear rotatably mounted on said carriage, a crank pin pivotally secured to said gear and slidably engaged with said bar, a pinion gear rotatably mounted on said carriage and in mesh with said first gear, and a rack member slidably extending through a hole formed axially through one end of said carriage and axially through the bearing assembly therefor and in mesh with said pinion gear and with a pinion gear on the shaft of said second motor.

4. In a horizon and bank indicator for an aircraft trainer, a frame, a first and a second driving motor mounted on said frame, a bank indicating scale secured to said frame, a carriage pivotally mounted in said frame, a background disc having a bank pointer secured thereto carried by said carriage, gearing driven by said first motor for rotating said carriage to move said disc and pointer with respect to said scale, a horizon bar pivoted on said carriage, and means driven by said second motor for moving said horizon bar over the face of said background disc comprising a gear rotatably mounted on said carriage, a crank pin pivotally secured to said gear and slidably engaged with said bar, a pinion gear rotatably mounted on said carriage and in mesh with said first gear, a first rack slidably mounted on said carriage and in mesh with said pinion gear, a second rack operable by a pinion on the shaft of said second motor and a rod connecting said rack and extending through a hole formed axially in a pivotal mounting of said carriage.

5. In a horizon and bank indicator for an aircraft trainer, a frame, a first and a second driving motor mounted on said frame, a bank indicating scale and an aircraft silhouette secured to said frame, a carriage pivotally mounted in said frame, a background disc having a bank pointer secured thereto carried by said carriage, gearing driven by said first motor for rotating said carriage to move said disc and pointer with respect to said scale, a horizon bar pivoted on said carriage, and means driven by said second motor for moving said horizon bar over the face of said background disc and with respect to said silhouette comprising a gear rotatably mounted on said carriage, a crank pin pivotally secured to said gear and slidably engaged with said bar, a pinion gear rotatably mounted on said carriage and in mesh with said first gear, a first rack slidably mounted on said carriage and in mesh with said pinion gear, a second rack operable by a pinion on the shaft of said second motor and a rod connecting said rack and extending through a hole formed axially in a pivotal mounting of said carriage.

6. In a horizon and bank indicator for an aircraft trainer, a frame, a first and a second driving motor mounted on said frame, a bank indicating scale secured to said frame, a carriage pivotally mounted in said frame, a background disc having a bank pointer secured thereto carried by said carriage, gearing driven by said first motor for rotating said carriage to move said disc and pointer with respect to said scale, a horizon bar pivoted on said carriage, and means driven by said second motor for moving said horizon bar over the face of the background disc comprising a gear rotatably mounted on said carriage, a crank pin pivotally secured to said gear and slidably engaged with said bar, a pinion gear rotatably mounted on said carriage and in mesh with said first gear, a first rack slidably mounted on said carriage and in mesh with said pinion gear, a rod connected to said rack and extending freely through a hole formed axially in a pivotal mounting of said carriage, a second rack operable by a pinion on the shaft of said second motor, and a swivel coupling between said rod and said second rack for permitting rotation of said carriage without hindrance from said second rack.

7. In a horizon and bank indicator for an aircraft trainer, a frame, a first and a second driving motor mounted on said frame, a bank indicating scale secured to said frame, a carriage pivotally mounted in said frame, a background disc having a bank pointer secured thereto carried by said carriage, gearing driven by said first motor for rotating said carriage to move said disc and pointer with respect to said scale, a horizon bar pivoted on said carriage, means driven by said second motor for moving said horizon bar over the face of said background disc and adjustable weights for counter-balancing said carriage and said horizon bar for enabling the movement thereof with the minimum expenditure of energy by said motors.

CLARENCE I. BAKER.